(12) United States Patent
Tai et al.

(10) Patent No.: US 6,932,520 B2
(45) Date of Patent: Aug. 23, 2005

(54) MODULAR OPTICAL COMPONENTS

(75) Inventors: Kuochou Tai, Fremont, CA (US); Warren Hale Lewis, Sunnyvale, CA (US); Long Yang, Union City, CA (US)

(73) Assignee: JDS Uniphase Corporation, San Jose, CA (US)

( * ) Notice: Subject to any disclaimer, the term of this patent is extended or adjusted under 35 U.S.C. 154(b) by 73 days.

(21) Appl. No.: 10/357,062

(22) Filed: Feb. 3, 2003

(65) Prior Publication Data

US 2004/0151444 A1 Aug. 5, 2004

(51) Int. Cl.[7] ................................................. G02B 6/42
(52) U.S. Cl. .......................................... 385/93; 385/47
(58) Field of Search ........................................... 385/93

(56) References Cited

U.S. PATENT DOCUMENTS

| | | | |
|---|---|---|---|
| 5,510,932 A | 4/1996 | Go et al. ..................... | 359/341 |
| 5,905,827 A | 5/1999 | Naganuma et al. ........... | 385/31 |
| 5,943,461 A * | 8/1999 | Shahid ......................... | 385/92 |
| 5,966,488 A * | 10/1999 | Miura et al. .................. | 385/93 |
| 6,331,992 B1 * | 12/2001 | Gilliland et al. .............. | 372/50 |
| 6,760,516 B2 * | 7/2004 | Brun et al. .................... | 385/34 |
| 2004/0101259 A1 * | 5/2004 | Kilan ........................... | 385/93 |

* cited by examiner

*Primary Examiner*—John R. Lee
*Assistant Examiner*—Philip A. Johnston
(74) *Attorney, Agent, or Firm*—Allen, Dyer, Doppelt, Milbrath & Gilchrist, P.A.

(57) ABSTRACT

The invention relates to optical modules for use in larger electro-optic components, such as erbium doped fiber amplifiers. One aspect of the invention relates to the optical module including input and/or output fiber tube ferrules surrounded by glass mounting sleeves secured to a metal housing using a suitable adhesive. Preferably, the optical module includes one or more optical elements, such as isolators, WDM filters and beam splitters, for effecting light traveling therethrough before entering or exiting a main housing of the electro-optic component. Another aspect of the invention relates to the electro-optic component including the main housing with gaps in the outer wall thereof for receiving the optical modules. Preferably, the optical component includes an electro-optical system including lasers, erbium doped fiber, an integrated circuit board and controller hardware. The present invention provides a fully integrated system, while eliminating the vast majority of optical splicing required in conventional electro-optical components.

8 Claims, 9 Drawing Sheets

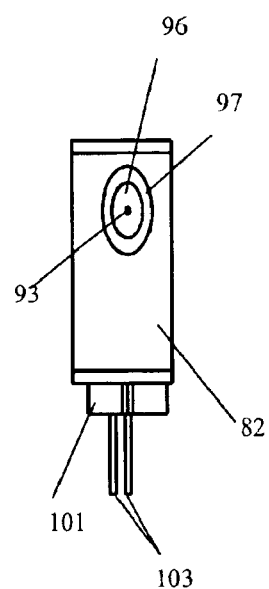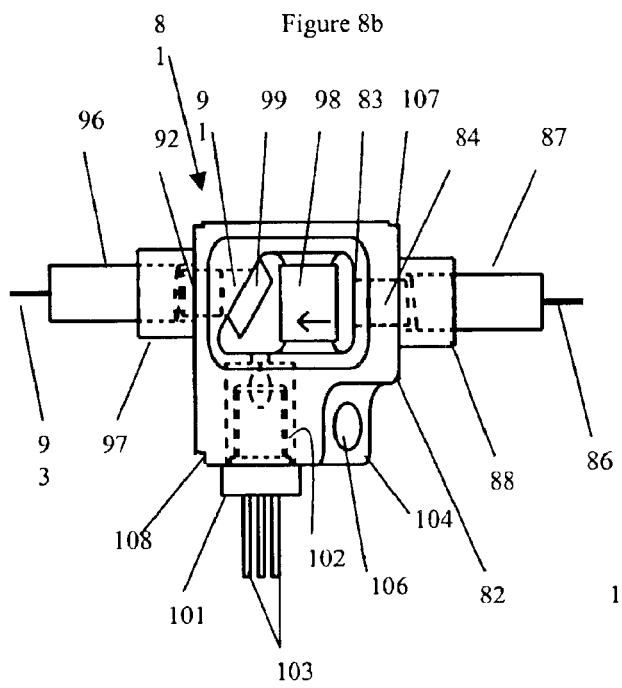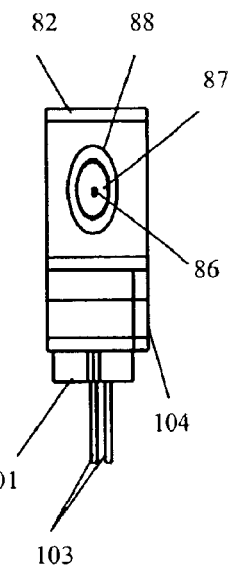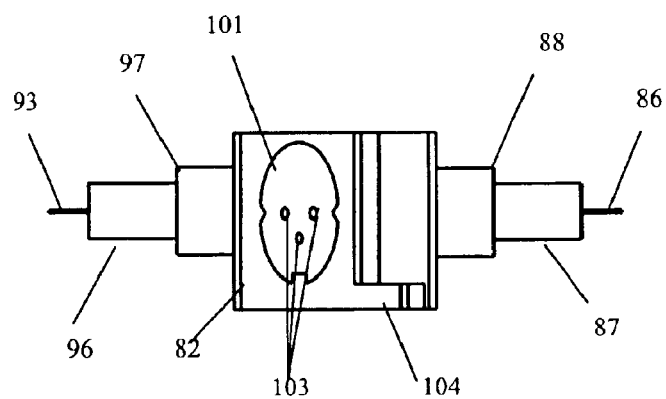

MODULAR OPTICAL COMPONENTS

CROSS-REFERENCE TO RELATED APPLICATIONS

This application is the first relating to the present invention.

TECHNICAL FIELD

The present invention relates to optical modules, and in particular to optical modules forming an integral part of a more complex optical component.

BACKGROUND OF THE INVENTION

Conventional optical modules, such as the wavelength division multiplexing (WDM) centerpieces 1a and 1b disclosed in FIGS. 1 and 2, respectively, include an input fiber 2 and a first output fiber 3 encased in a double-bore fiber tube ferrule 4, and optically coupled to a collimating lens 6, which collimates a beam of light launched from the input fiber 3 onto a WDM filter 7. Typically, the WDM filter 7 is designed to pass one or more selected wavelength channels to a focusing lens 8, while reflecting the remaining wavelength channels back through the lens 6 to the first output fiber 3. The focusing lens 8 focuses the transmitted light onto a second output fiber 9, which is encased in a fiber tube ferrule 11.

One method of assembling the elements of the centerpiece, illustrated in FIG. 1, includes gluing all of the interfaces 12 together with an adhesive selected to bind glass elements together. The aforementioned method is relatively labor intensive and results in adhesive in the optical path.

In an effort to automate the assembly process and eliminate the need for adhesive in the optical path a method involving metal, e.g. stainless steel, sleeves was developed. FIG. 2 illustrates this method, in which the ferrules 4 and 11, and the lenses 6 and 8 are secured in metal sleeves 13, which get fixed together by solder or welds 14. Unfortunately, inconsistencies develop in the welding process, in particular misalignment caused by post weld shifting of the elements.

A conventional optical component, i.e. an erbium doped fiber amplifier (EDFA), is illustrated in FIG. 3, and includes as many as eleven discrete modules coupled together by as many as twelve different splices 20. An input fiber 21 launches a main signal to be amplified through a first tap coupler 22, which directs a portion of the main signal to an initial photodiode receiver 23. Isolators 24 ensures light does not travel backward through the system. WDM centerpieces 26, such as the ones illustrated in FIGS. 1 and 2, transmit the main signal through the erbium doped fiber 27 for amplification, while reflecting pumping signals from pump lasers 28 therethrough. A second tap coupler 29 directs a portion of the amplified signal to a final photodiode 31 for gain measurement and control. It is quite evident from this design that the assembly process would be quite labor intensive, and that the number of splices 20 provide numerous opportunities for excess losses.

An object of the present invention is to overcome the shortcomings of the prior art by providing a simplified module incorporating several functions which is itself a part of a larger component.

SUMMARY OF THE INVENTION

Accordingly, the present invention relates to an optical module comprising:

a first optical fiber, encased in a first fiber tube ferrule, for transmitting a beam of light;

a first lens for collimating the beam light from the first optical fiber;

a metal housing for supporting an optical element therein, the metal housing including a first passage extending through an outer wall thereof for receiving the first lens, which directs the beam of light to the optical element;

a first glass sleeve fixed to the first fiber tube ferrule for mounting the first fiber tube ferrule to the metal housing; and an adhesive for fixing the first glass sleeve to the metal housing.

Another aspect of the present invention relates to an optical component comprising:

a main housing for enclosing an optical system, the main housing including a first gap in an outer wall thereof; and a first module mounted in the first gap, comprising:

a first module housing for supporting a first optical element therein, the first module housing including a first passage extending through a first outer wall thereof, and a second passage extending through a second outer wall thereof;

a first lens disposed in the first passage for directing a beam of light at the first optical element;

a first optical fiber, one end of which is encased in a first fiber tube ferrule and optically coupled with the first lens, for transmitting a beam of light to the first optical element;

a second lens disposed in the second passage for receiving the beam light from the first optical element; and a second optical fiber, one end of which is encased in a second fiber tube ferrule and optically couple to the second lens, for receiving the beam of light therefrom, and the other end of which is optically coupled to the optical system;

wherein the first module housing mates with the outer wall of the main housing on either side of the first gap, whereby the first outer wall of the first module housing forms a substantially continuous wall with the outer wall of the main housing; and wherein the first optical fiber extends outwardly from the continuous wall, and the second optical fiber extends inside the main housing.

BRIEF DESCRIPTION OF THE DRAWINGS

The invention will be described in greater detail with reference to the accompanying drawings which represent preferred embodiments thereof, wherein:

FIGS. 8a, 8b, 8c and 8d are end, top, end and side views, respectively, of an optical module according to another embodiment of the present invention;

DETAILED DESCRIPTION

Figure 4:
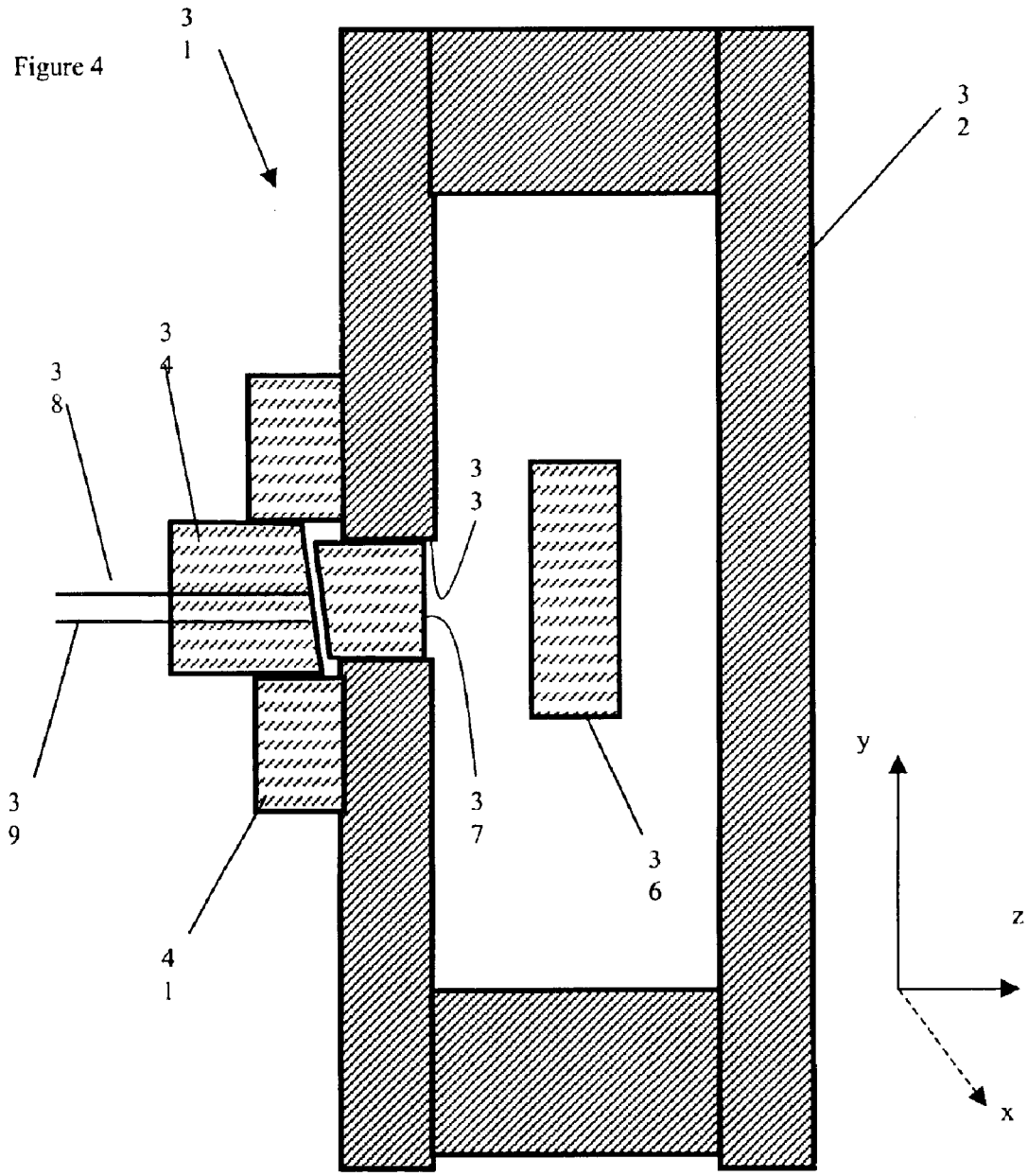
FIG. 4 is a cross-sectional view of an optical module according to the present invention.
Figure 5:
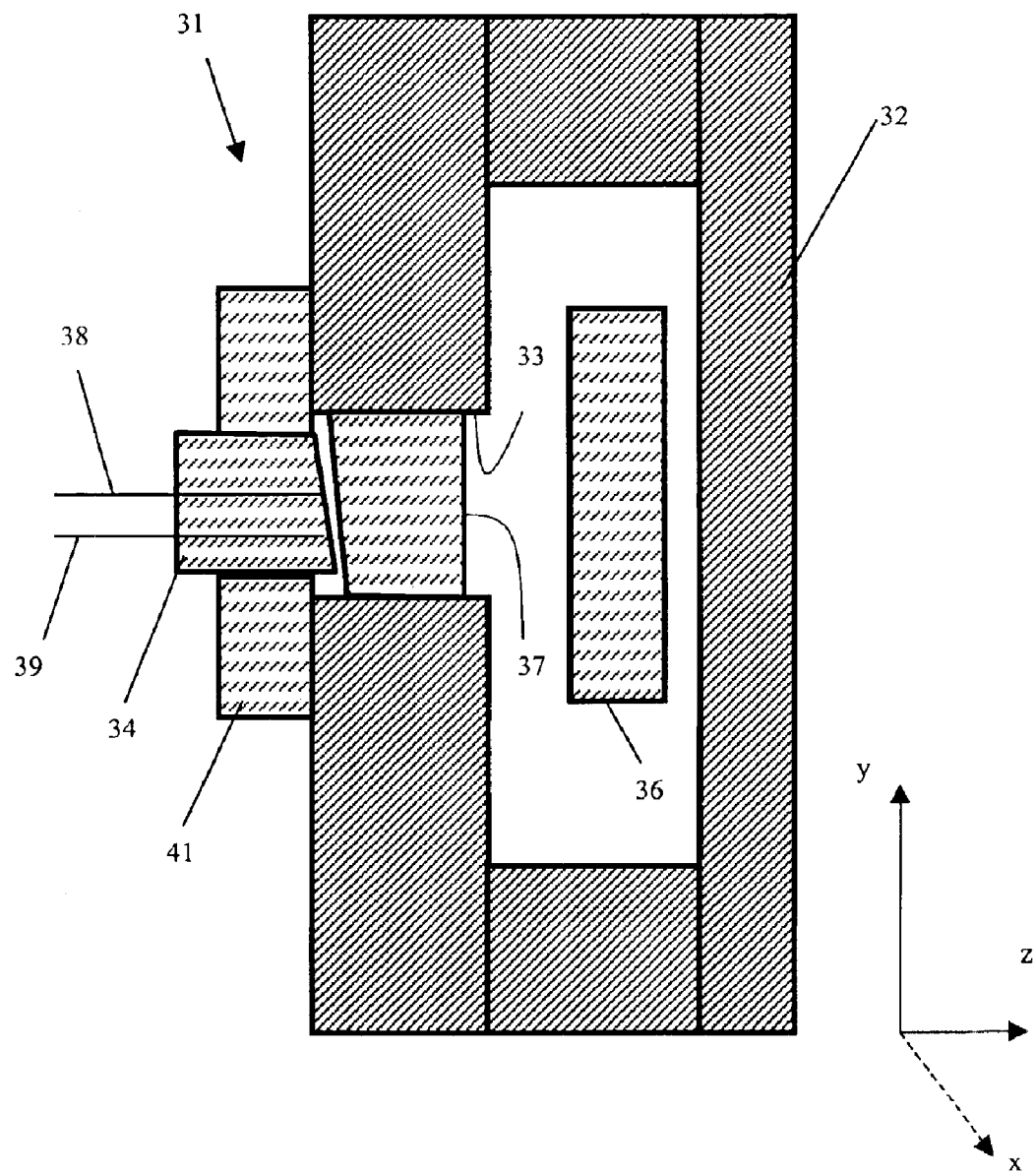
FIG. 5 is a cross-sectional view of an optical module according to another embodiment of the present invention.

With reference to FIGS. 4 and 5, the module 31 according to the present invention, which forms a building block for a larger component, includes a metal housing 32, a lens 33 and a fiber tube ferrule 34. The housing 32 is constructed out of one or more materials, e.g. Kovar®, Invar® or Copper/Tungsten (Cu/W), suitably matched with regards to thermal expansion to the lens 33 and the ferrule 34, both made from glass. The housing 32 can be adapted to enclose any number of optical elements 36, e.g. isolators, beam splitters, WDM filters, switches, interleavers, amplifiers. The housing 32 is accessed through a port in the form of a passage 37, which extends through a wall of the housing 32 for receiving the lens 33. The lens 33 is secured in the passage by any suitable means, e.g. glue or friction fit. The ferrule 34 includes the ends of an input fiber 38 and an output fiber 39 encased therein. Use of a single or a double bore ferrule are within the scope of the invention, as well as the use of one or more access ports. A glass sleeve 41 is used to fix the ferrule 34 to the housing 32. During assembly, a suitable adhesive, e.g. a heat curing epoxy such as Epo-Tek® 353ND, is applied between the ferrule 34 and the sleeve 41, and between the sleeve 41 and the housing 32. Before the adhesive has cured, the position of the ferrule 34 can be adjusted in the x, y and z directions to obtain maximum optical coupling between the fibers 38 and 39 and the optical element 36.

In FIG. 4, the diameter of the ferrule 34 is larger than the diameter of the lens 33, whereby the lens 33 is able to extend outwardly from the housing 32 into the sleeve 41. Conversely, as illustrated in FIG. 5, the diameter of the ferrule 34 can be made smaller than the diameter of the lens 33, whereby the ferrule 34 is able to extend into the passage 37.

Figure 6:
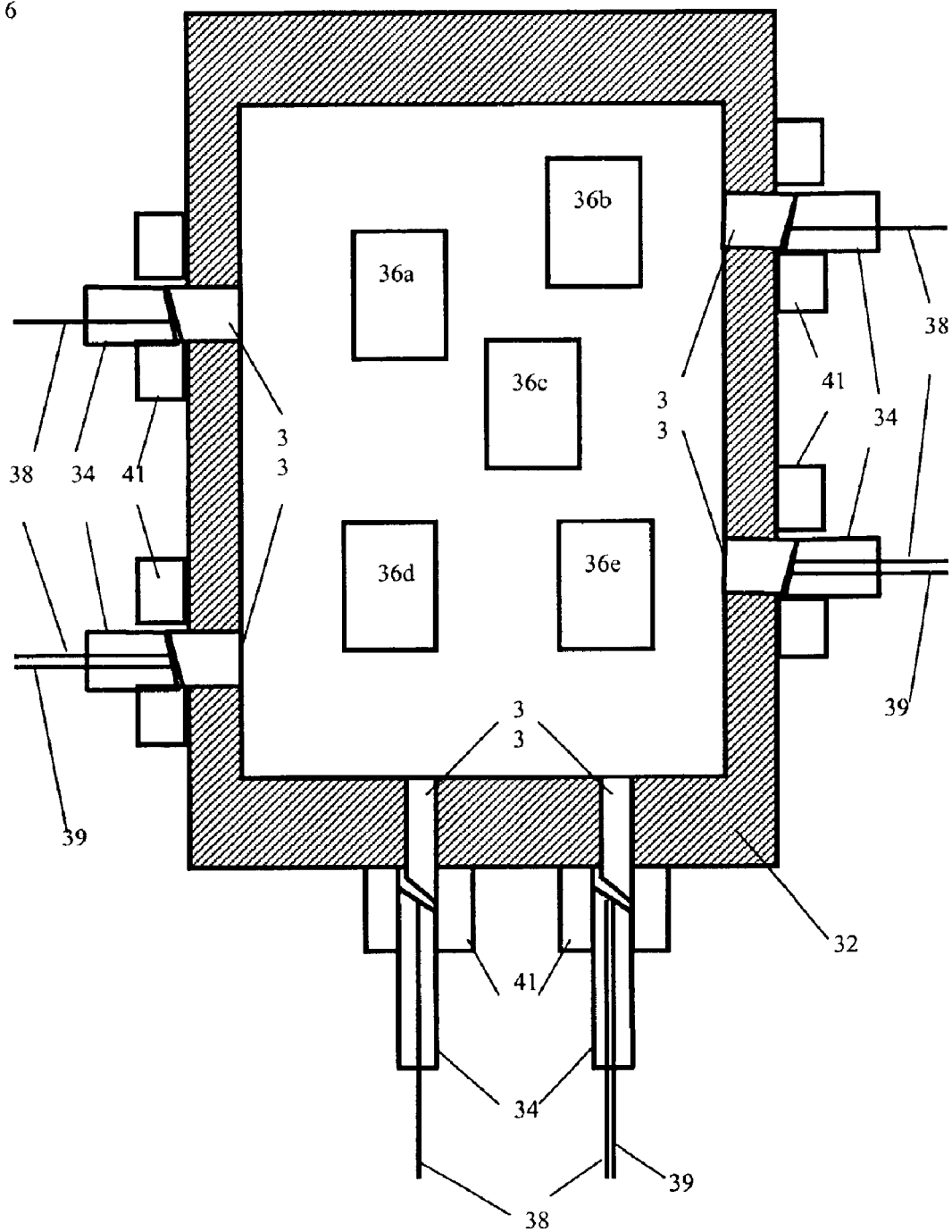
FIG. 6 is a cross-sectional view of an optical module according to another embodiment of the present invention.

FIG. 6 illustrates an alternative embodiment of the present invention in which a plurality of ports with corresponding lenses 33 are provided to access a plurality of different optical elements 36a, 36b, 36c, 36d and 36e as hereinbefore described.

Figure 7:
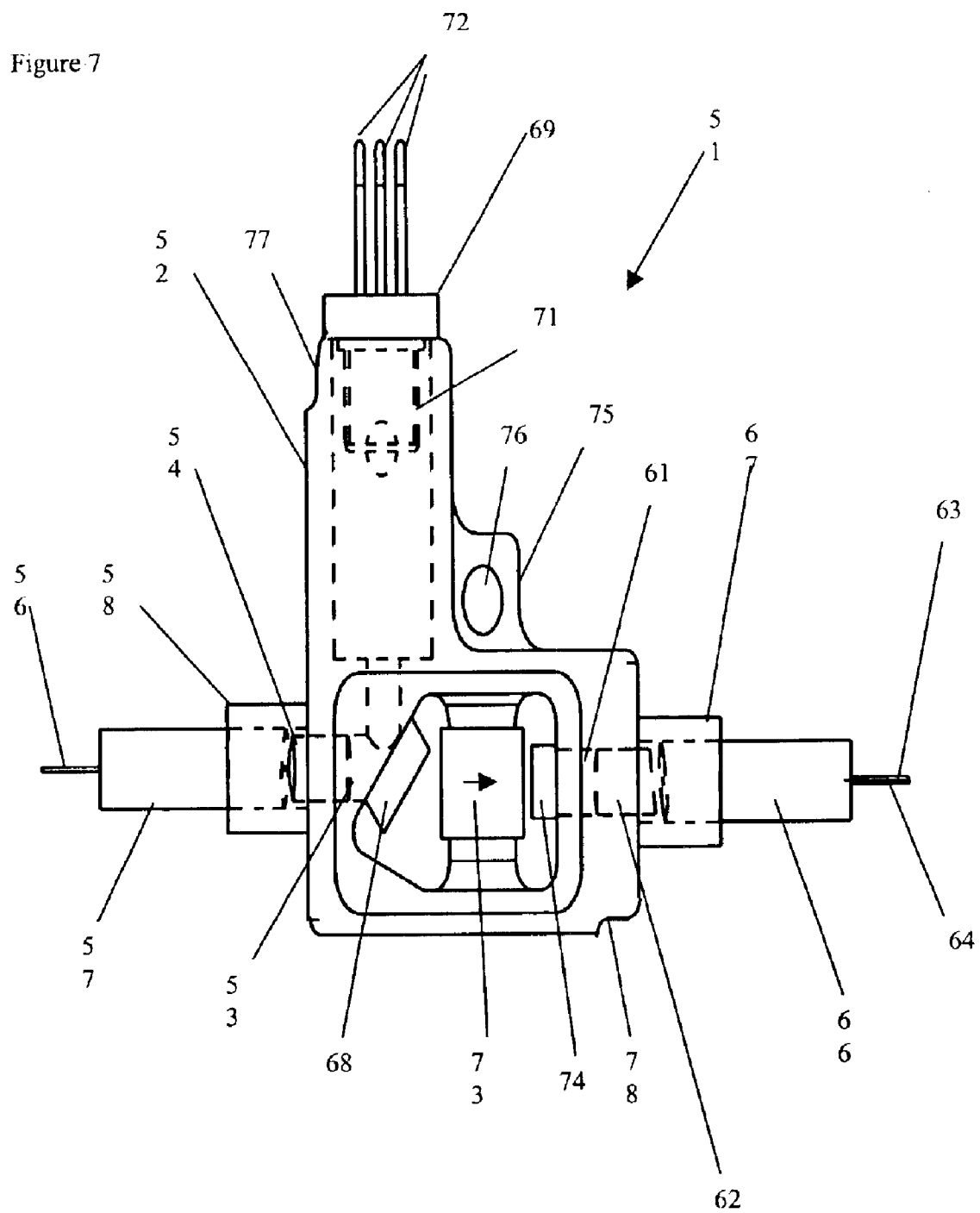
FIG. 7 is a top view of an optical module according to another embodiment of the present invention.
Figure 9:
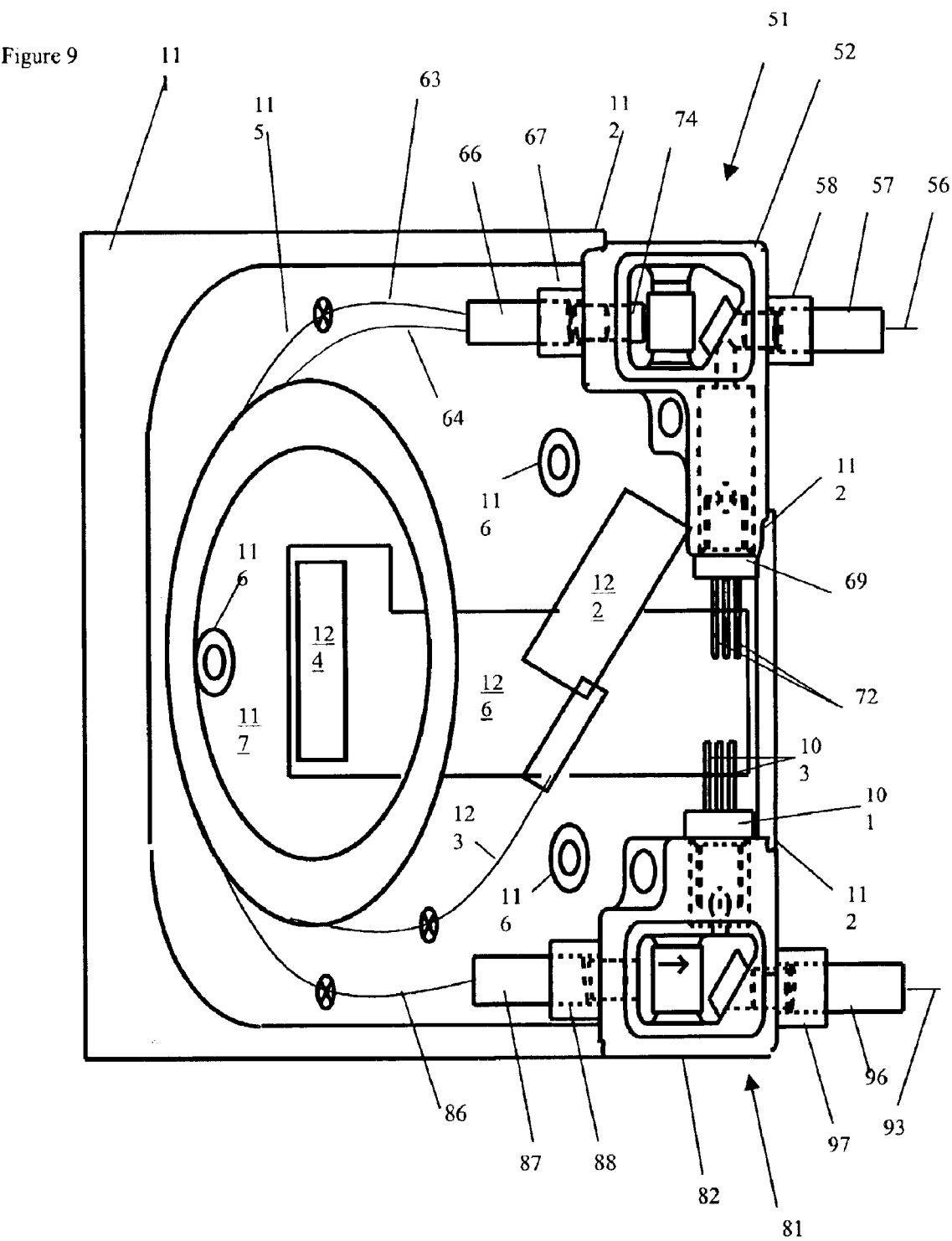
FIG. 9 is a top view of an optical component according to the present invention including the optical modules of FIGS. 7 and 8.
Figure 10:
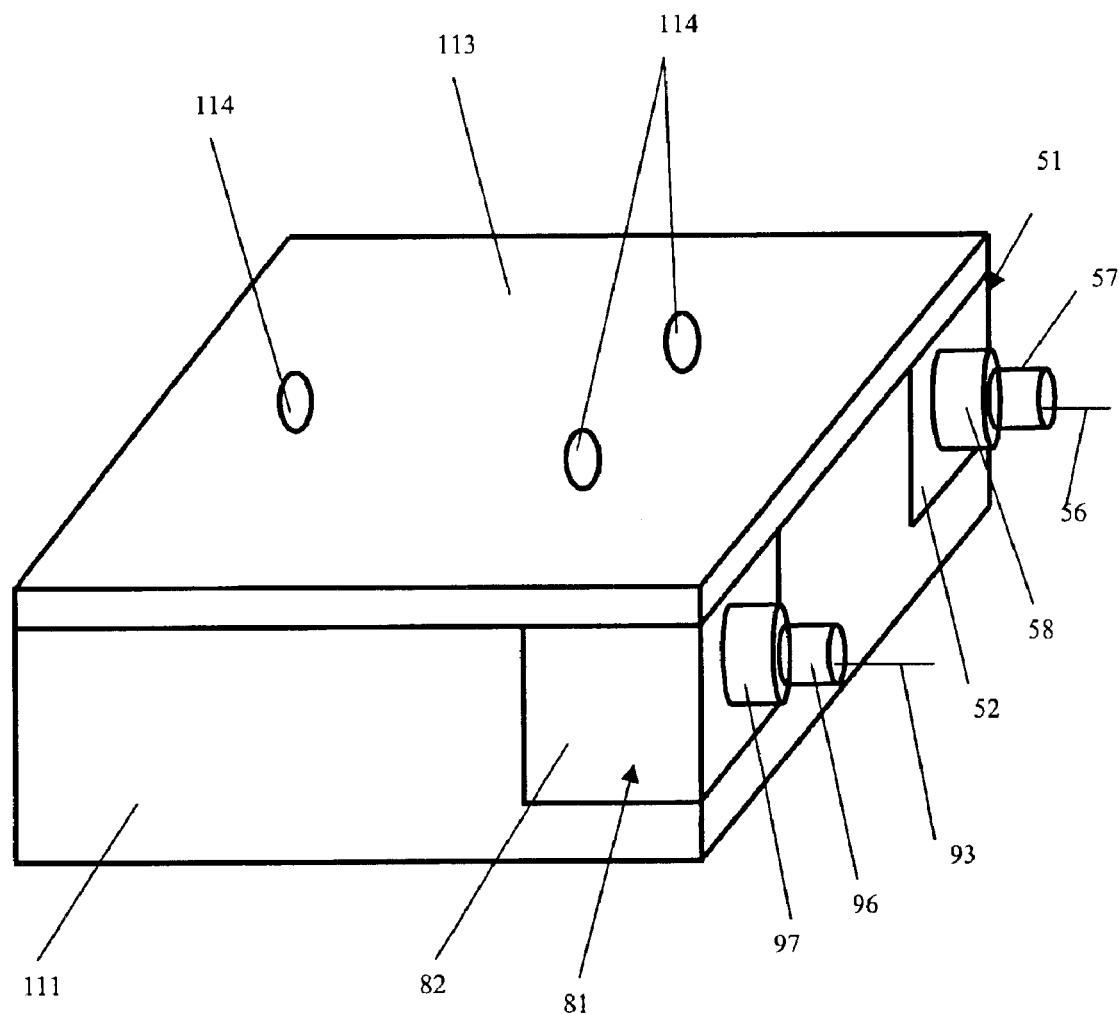
FIG. 10 is a isometric view of the optical component of FIG. 9.

A preferred embodiment of a module according to the present invention is illustrated in FIG. 7. The module 51 forms an input module for an EDFA or other amplifying-medium component, which is illustrated in FIGS. 9 and 10. The module 51 includes a housing 52 constructed from a suitable metal with a coefficient of thermal expansion (CTE) similar to that of glass, as hereinbefore discussed. The housing 52 includes a first port in the form of a first passage 53, which receives a first lens 54. An end of an optical fiber 56 is encased in a single bore ferrule 57, which is connected to the housing 52 by a glass sleeve 58, as hereinbefore discussed with reference to FIGS. 4, 5 and 6. A second port in the form of a second passage 61 is also provided for receiving a second lens 62. The ends of two optical fibers 63 and 64 are encase in a double bore ferrule 66, which is fixed to the housing 52 with a second glass sleeve 67.

In use, a beam of light exits the fiber 56 and gets directed by the lens 54 through a partial beam splitter 68. The beam splitter 68 directs a portion of the beam of light to an input photodiode receiver 69 to obtain an initial power reading. The photodiode 69 is disposed in a third passage 71 in the housing 52. Electric leads 72 extend outwardly from the photodiode 69 for connection with a printed circuit board (see FIG. 9). The remainder of the light travels through an isolator 73 to a WDM filter 74, which transmits the light to the second lens 62 and onto the optical fiber 63. The need for optical fiber 64 will hereinafter be discussed with reference to FIGS. 9 and 10. The housing 52 also includes a flange 75 with a hole 76 for receiving a fastener (not shown) to mount the module 51 in the EDFA component (see FIG. 9). Moreover, recesses 77 and 78 are provided in the outer surface of the housing 52 for mating with corresponding mating surfaces on the EDFA component, as will be described herein below.

FIGS. 8a to 8d illustrate an output module 81 for the EDFA component illustrated in FIGS. 9 and 10. The output module 81 includes a housing 82 constructed from a suitable metal with a coefficient of thermal expansion (CTE) similar to that of glass, as hereinbefore discussed. The housing 82 includes a first port in the form of a first passage 83, which receives a first lens 84. An end of an optical fiber 86 is encased in a single bore ferrule 87, which is connected to the housing 82 by a glass sleeve 88, as hereinbefore discussed with reference to FIGS. 4, 5 and 6. A second port in the form of a second passage 91 is also provided for receiving a second lens 92. The ends of an optical fiber 93 is encased in a single bore ferrule 96, which is fixed to the housing 82 with a second glass sleeve 97.

In use, a beam of light exits the fiber 86 and gets directed by the lens 84 through an isolator 98 to a partial beam splitter 99. The beam splitter 99 directs a portion of the beam of light to an output photodiode receiver 101 to obtain an final power reading. The photodiode 101 is disposed in a third passage 102 in the housing 82. Electric leads 103 extend outwardly from the photodiode 101 for connection with a printed circuit board (see FIG. 9). The remainder of the light beam is focused onto the fiber 93 by the lens 92. The housing 82 also includes a flange 104 with a hole 106 for receiving a fastener (not shown) to mount the module 81 in the EDFA component (see FIG. 9). Moreover, recesses 107 and 108 are provided in the outer surface of the housing 82 for mating with corresponding mating surfaces on the EDFA component, as will be described herein below.

The entire EDFA component 110 is depicted in FIGS. 9 and 10 and includes main housing 111 with gaps in the outer wall thereof for receiving the input module 51 (FIG. 7) and the output module 81 (FIGS. 8a to 8d). On each side of the gaps, the main housing 111 includes protruding mating surfaces 112 for interconnecting with corresponding recesses 77, 78, 107 and 108. The main housing 111 also includes a cover 113 (FIG. 10) secured with fasteners 114 to pedestals 116, which extend upwardly from the base 117 of the housing 111.

When in use as an amplifier, the fibers 63 and 86 are spliced to an erbium doped fiber 115 wound around a reel 121. Alternatively, it is possible to eliminate on or two of the splices by providing erbium doped fibers for the fibers 63 and 86 and splicing them together or by providing a single erbium doped fiber extending from both the input and output modules 51 and 81, respectively. One or more pump lasers 122 are provided to pump light at a suitable wavelength to supply the input light with the necessary optical power. The pump laser 122 launches light via a suitable waveguide 123 to the fiber 64, and the light is reflected off the WDM filter onto the fiber 63 for amplifying the signal therein. The gain of the amplifier is controlled by an integrated circuit chip controller 124 mounted on a circuit board 126. The leads 72 and 103 from the photodiodes 69 and 101, respectively, are also electrically connected to the circuit board 126 for sending the input and output power readings to the controller 124, which then controls the pump laser 122 accordingly.

Figure 1:
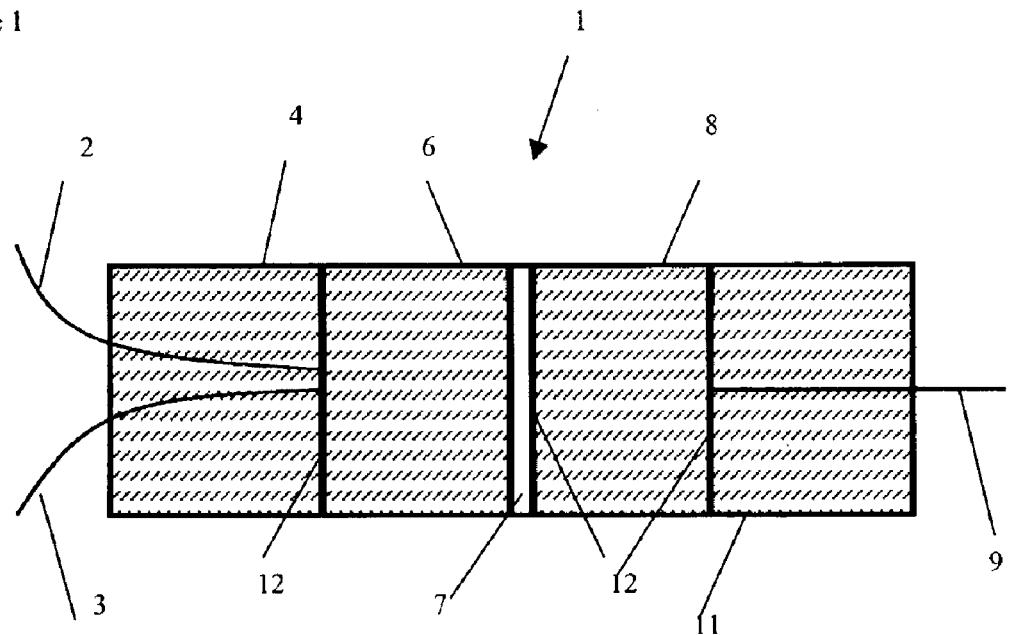
FIG. 1 is a cross-sectional view of a conventional optical component.
Figure 2:
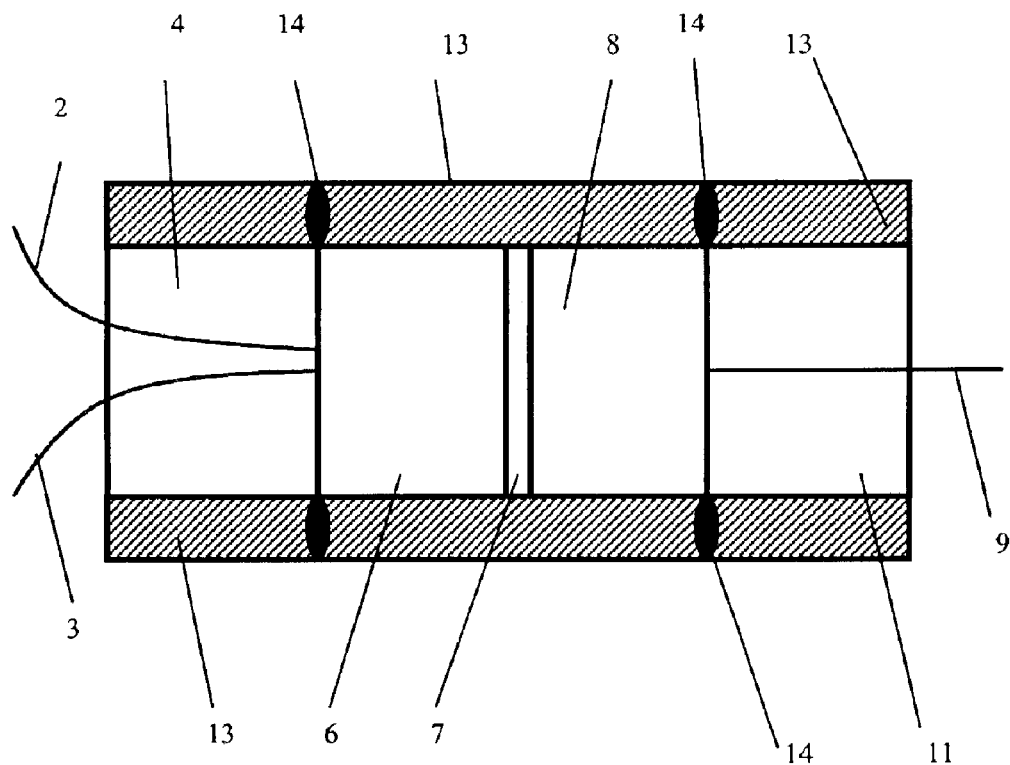
FIG. 2 is a cross-sectional view of a conventional optical component.
Figure 3:
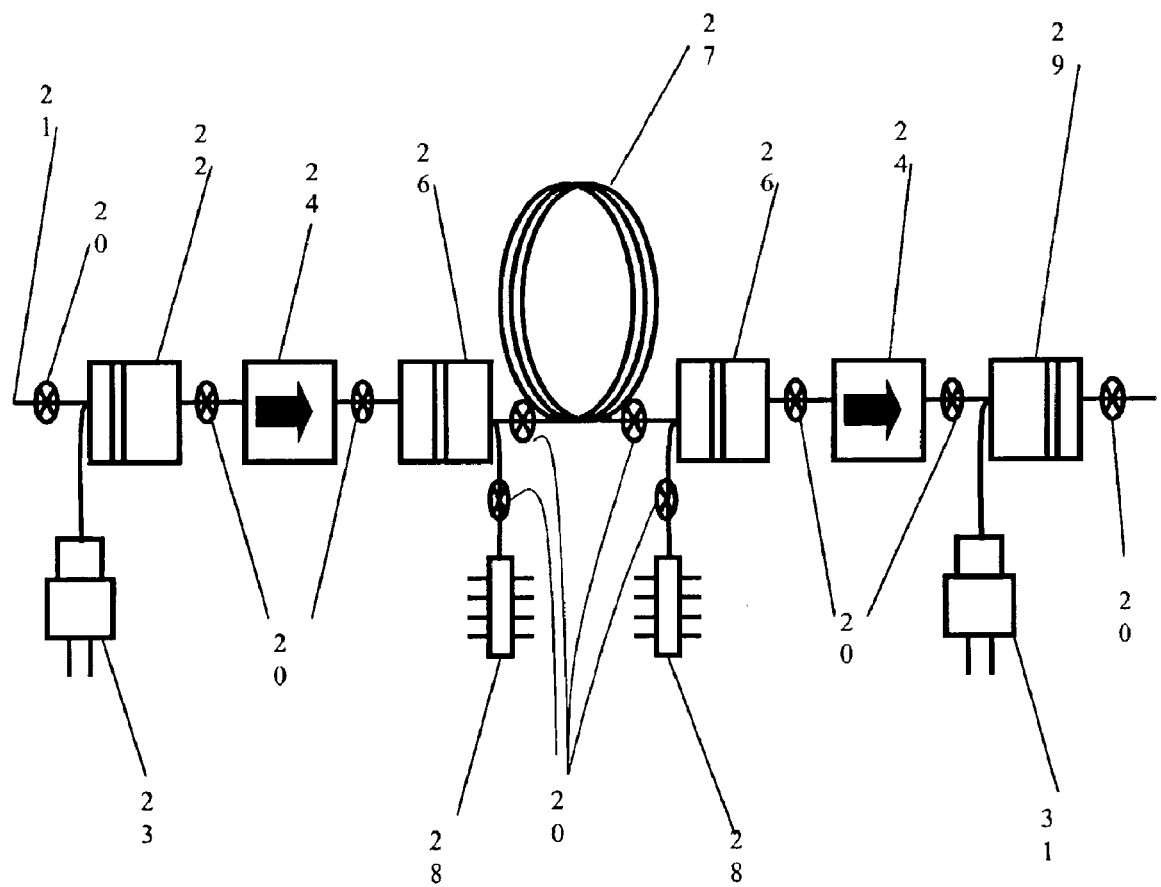
FIG. 3 is a schematic representation of a conventional optical amplifier system.

As can be seen from the following description, the number of splices in the EDFA component can be minimized from over ten required in the conventional device of FIG. 3 to approximately two or three, thereby greatly reducing manufacturing time and costs. Moreover, the housings 52 and 82 of the modules 51 and 81, respectively, become part of the main housing 111, thereby eliminating the need for feedthroughs or extra splices.

We claim:

1. An optical component comprising:
   a main housing for enclosing an optical system, the main housing including a first gap in an outer wall thereof; and
   a first module mounted in the first gap, comprising:
      a first module housing for supporting a first optical element therein, the first module housing including a first passage extending through a first outer wall thereof, and a second passage extending through a second outer wall thereof;
      a first lens disposed in the first passage for directing a beam of light at the first optical element;
      a first optical fiber, one end of which is encased in a first fiber tube ferrule and optically coupled with the first lens, for transmitting a beam of light to the first optical element;
      a second lens disposed in the second passage for receiving the beam light from the first optical element; and
      a second optical fiber, one end of which is encased in a second fiber tube ferrule and optically couple to the second lens, for receiving the beam of light therefrom, and the other end of which is optically coupled to the optical system;
   wherein the first module housing mates with the outer wall of the main housing on either side of the first gap, whereby the first outer wall of the first module housing forms a substantially continuous wall with the outer wall of the main housing; and
   wherein the first optical fiber extends outwardly from the continuous wall, and the second optical fiber extends inside the main housing.

2. The optical component according to claim 1, further comprising:
   a first mating surface in the outer wall of the main housing on one side of the first gap;
   a second mating surface in the outer wall of the main housing on the other side of the first gap;
   a third mating surface in the first outer wall of the first module for interconnecting with the first mating surface; and
   a fourth mating surface in the first outer wall of the first module for interconnecting with the second mating surface.

3. The optical component according to claim 1, further comprising:
   a second gap in the main housing; and
   a second module mounted in the second gap, comprising:
      a second module housing for supporting a second optical element therein, the second module housing including a third passage extending through a third outer wall thereof, and a fourth passage extending through a fourth outer wall thereof;
      a third lens disposed in the third passage for directing a beam of light at the second optical element;
      a third optical fiber, one end of which is encased in a third fiber tube ferrule and optically coupled with the third lens, for transmitting a beam of light from the optical system to the second optical element;
      a fourth lens disposed in the fourth passage for receiving the beam light from the second optical element;
      a fourth optical fiber, one end of which is encased in a fourth fiber tube ferrule and optically couple to the fourth lens for receiving the beam of light therefrom; and
   wherein the second module housing mates with the outer wall of the main housing on either side of the second gap, whereby the first outer wall of the second module housing forms a substantially continuous wall with the outer wall of the main housing; and
   wherein the fourth optical fiber extends outwardly from the continuous wall, and the third optical fiber extends inside the main housing.

4. The optical component according to claim 3, further comprising:
   a first beam splitter disposed in the first module housing between the first lens and the second lens for separating off a first portion of the beam of light;
   a first receiver for measuring a characteristic of the first portion of the beam of light;
   a second beam splitter disposed in the second module housing between the third lens and the fourth lens for separating off a second portion of the beam of light; and
   a second receiver for measuring a characteristic of the second portion of the beam of light.

5. The optical component according to claim 4, wherein the optical system comprises:
   an amplifying medium optical coupled between the second and third optical fibers; and
   a pump laser for launching a pump laser signal; and
   wherein the first module includes a multiplexer for multiplexing the pump laser signal and the beam of light, whereby the pump laser signal amplifies the beam of light in the amplifying medium.

6. The optical component according to claim 1, further comprising:
   a first sleeve fixed to the first fiber tube ferrule and the first module housing for mounting the first optical fiber relative to the first lens; and
   a second sleeve fixed to the second fiber tube ferrule and the first module housing for mounting the second optical fiber relative to the second lens.

7. The optical component according to claim 5, wherein first and second sleeves have coefficients of thermal expansion substantially matched to that of the first module housing.

8. The optical component according to claim 7, wherein the first and second sleeves comprise glass, and the first module housing comprises a metal selected from the group consisting of Invar®, Kovar®, and Copper Tungsten; and wherein the first and second sleeves are fixed to the first module housing with a heat curing epoxy.

* * * * *